United States Patent [19]
Williams et al.

[11] 4,362,356
[45] Dec. 7, 1982

[54] CONCENTRIC OPTIC TERMINATION UTILIZING A FIXTURE

[75] Inventors: Russell H. Williams, Wormleysburg, Pa.; Robert F. Meeham, Sudbury, Mass.

[73] Assignee: AMP Incorporated, Harrisburg, Pa.

[21] Appl. No.: 256,351

[22] Filed: Apr. 22, 1981

Related U.S. Application Data

[63] Continuation of Ser. No. 940,926, Sep. 11, 1978, abandoned.

[51] Int. Cl.³ .............................................. G02B 7/26
[52] U.S. Cl. .............................. 350/96.20; 350/96.21
[58] Field of Search .................. 350/96.20, 96.21, 96.22

[56] References Cited
U.S. PATENT DOCUMENTS

| | | | |
|---|---|---|---|
| 3,869,194 | 3/1975 | Shiraishi et al. | 350/96 WC |
| 3,878,397 | 4/1975 | Robb et al. | 250/551 |
| 3,914,880 | 10/1975 | Dakss et al. | 350/96.21 |
| 3,995,935 | 12/1976 | McCartney | 350/96 C |
| 4,023,886 | 5/1977 | Nakayama et al. | 350/96.21 |
| 4,026,972 | 5/1977 | Phillips et al. | 264/1 |
| 4,033,668 | 7/1977 | Presby | 350/96 C |
| 4,076,376 | 2/1978 | Slaughter | 350/96.21 |
| 4,090,778 | 5/1978 | Phillips et al. | 350/96.20 |
| 4,146,300 | 3/1979 | Kaiser | 350/96.21 |
| 4,167,304 | 9/1979 | Gelbke | 350/96.21 |

FOREIGN PATENT DOCUMENTS 2510618 9/1975 Fed. Rep. of Germany ... 350/96.20

OTHER PUBLICATIONS

"Fiber Optic Connectors data sheet" *Cablewave Systems* No. 57 B, Mar. 1978.

Primary Examiner—John D. Lee
Assistant Examiner—Frank Gonzalez
Attorney, Agent, or Firm—Adrian J. LaRue; Gerald K. Kita

[57] ABSTRACT

A method is disclosed for assembling an optic connector concentrically with a core of an optic waveguide cable by use of a fixture which retains the connector and core in concentric alignment while being secured to each other by adhesive bonding.

6 Claims, 7 Drawing Figures

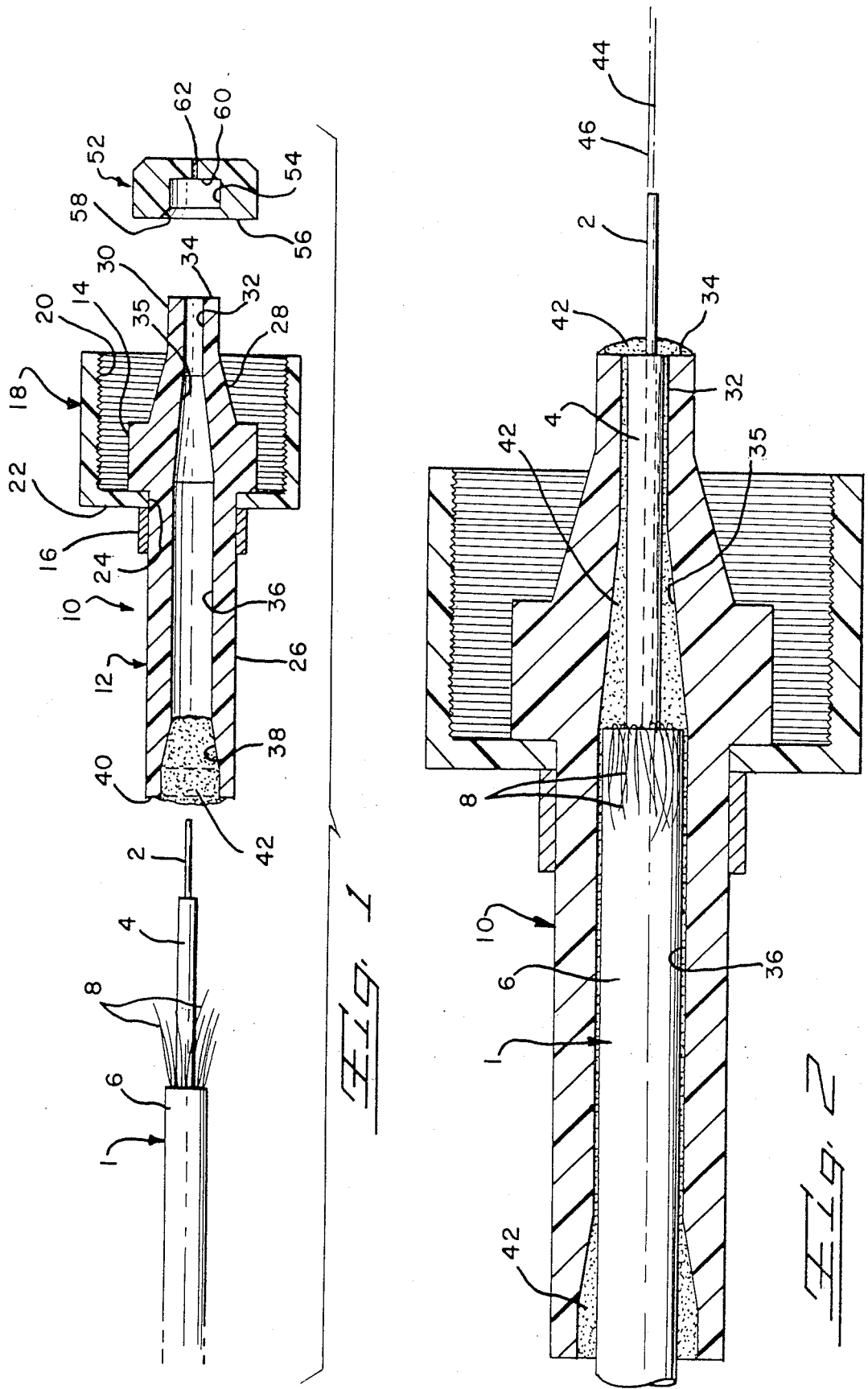

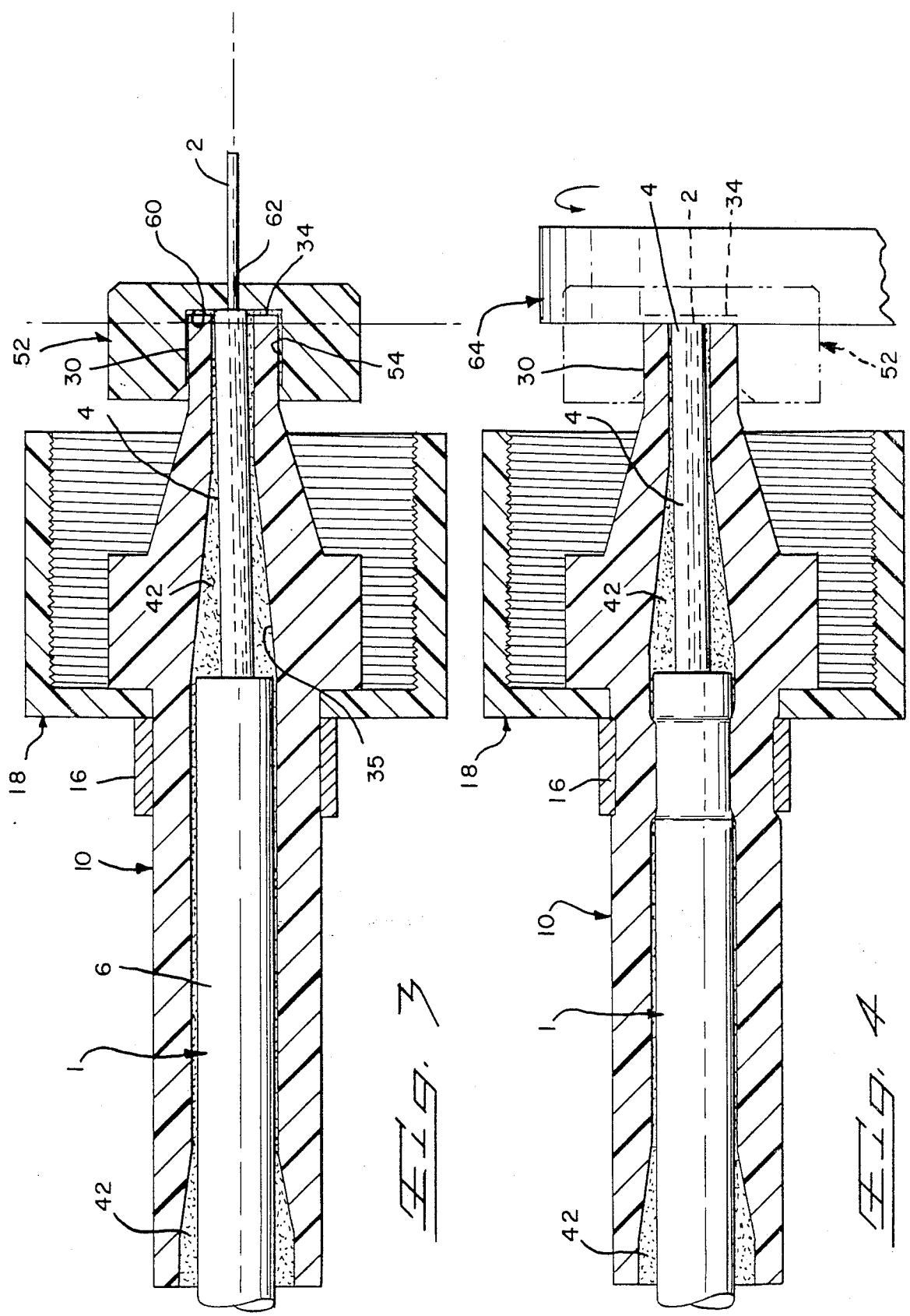

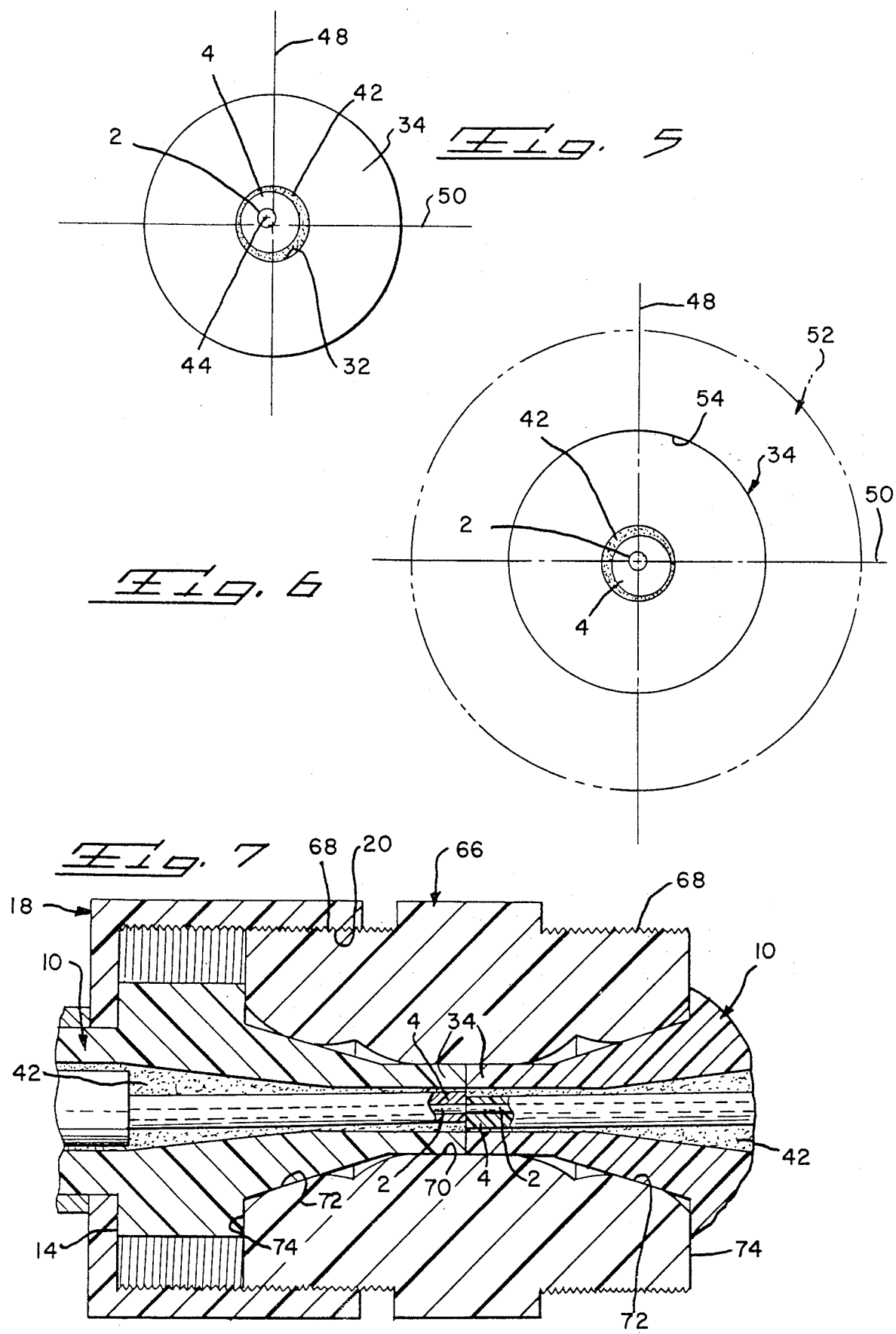

CONCENTRIC OPTIC TERMINATION UTILIZING A FIXTURE

This is a continuation of application Ser. No. 940,926 filed Sept. 11, 1978, now abandoned.

FIELD OF THE INVENTION

The present invention relates to assembly of an optic waveguide in a resilient ferrule which serves to align the waveguide in a sleeve form connector of which the ferrule becomes a component part.

BACKGROUND OF THE INVENTION

There is a need for coupling optic waveguides end to end for transfer of optic signals from one waveguide to the other. This is accomplished by use of a connector which brings one, highly polished, end of one waveguide into coincident alignment with a corresponding polished end of another waveguide. In one type of connector, each polished end is first secured within a cylindrical, resiliently deformable ferrule. Each ferrule is radially press fit within a common sleeve form connector body. Radial compression on the ferrules forces them to deform radially, serving to adjust the polished ends of the waveguides into coincident alignment within the connector body.

SUMMARY OF THE INVENTION

The present invention relates to assembly of a waveguide in a ferrule. There is a need for assuring concentricity of the waveguide core and the cylindrical dimension of the ferrule.

In a typical waveguide, the core portion transmits the optic signal. The core is overlaid by a layer of cladding portion of the waveguide having a chosen light index of refraction which, by light refraction, eliminates light attenuation by escape from the core. The diameter of the core can be carefully controlled. The outer layer of cladding often differs by as much as 30% in diameter and in concentricity with the core. The present invention recognizes the need for concentric alignment of the light transmitting core within the ferrule, disregarding alignment of the cladding. However, the finished assembly of the core and ferrule will retain all benefits provided by the cladding, which will extend unmodified entirely through the finished assembly.

In one form of the invention, the waveguide cladding is removed to expose a short, projecting end portion of the core. The waveguide and a quantity of solidifiable adhesive are located within the interior of a ferrule. The ferrule is radially press fit within an encircling fixture which adjusts the projecting end of the waveguide core precisely coaxial with the ferrule, until the adhesive solidifies to secure the core in desired coaxial alignment. The core is then ground and polished flushed with the end of the ferrule. The fixture is removed before polishing or is polished away by the grinding and polishing operation.

OBJECTS

An object of the present invention is to provide an optic connector which is concentric with a core of an optic waveguide cable.

Another object is to provide a method for assembling an optic connector concentrically with the core of an optic waveguide cable by use of a disposable and inexpensive fixture which retains the connector and core in concentric alignment while being secured to each other by adhesive bonding.

Another object is to provide for assembly of an optic waveguide in a ferrule which serves to align the core of the waveguide in a sleeve form connector body of which the ferrule becomes a component part.

Another object is to provide an assembly of a ferrule and optic waveguide having its light transmitting core concentrically aligned within the ferrule without regard to alignment of the cladding, yet retaining all benefits provided by the cladding which extends unmodified entirely through the assembly.

Other objects and advantages of the present invention will become apparent from the following detailed description taken in conjunction with the drawings.

SUMMARY OF THE DRAWINGS

FIG. 1 is an enlarged elevation of a waveguide cable and a connector, together with an alignment fixture, with the component parts in exploded configuration and in section to illustrate the details thereof.

FIG. 2 is an enlarged elevation in section illustrating the component parts of FIG. 1 in assembled configuration prior to incorporation of the fixture.

FIG. 3 is an enlarged elevation in section similar to FIG. 2 illustrating the alignment fixture with the assembled parts.

FIG. 4 is an enlarged elevation in section similar to FIG. 3, and further diagramatically illustrating a grinding and polishing operation.

FIG. 5 is an enlarged end view of the assembly shown in FIG. 2, particularly illustrating coaxial misalignment of the waveguide core.

FIG. 6 is an enlarged diagramatic end view of the assembly as shown in FIG. 3 illustrating use of the fixture to coaxially align the waveguide core and connector ferrule.

FIG. 7 is an enlarged fragmentary elevation in section of a sleeve form connector illustrating end to end coincident alignment of a pair of optic wave guide cores terminated in corresponding connector ferrules according to the present invention.

DETAILED DESCRIPTION

With more particular reference to FIGS. 1 and 2 a waveguide cable is illustrated generally at 1 having a central light transmitting core 2 overlaid by a generally cylindrical layer of cladding 4, in turn, overlaid by an outer sheath 6 which forms a jacket for a plurality of thin flexible and fluffy fibers 8 which encircle the cladding 4 and provide resistance against tension applied to the cable 1. In a typical waveguide, the core 2 is silica having a diameter of 0.008 inches, the cladding is a plastic material of 0.024 inches diameter. The jacket 6 over the waveguide has a diameter of 0.078 inches. A commercially available cable is identified by the part number PFX-S120R, from E. I. DuPont, Wilmington, Del.

A connector is shown generally at 10 and comprises a one piece molded elongated ferrule 12 having an integral short cylindrical enlarged collar portion 14. The connector 10 further comprises a relatively thin cylindrical metal ring 16 freely assembled over the ferrule 12 adjacent the collar 14. To complete the connector assembly, a rigid plastic threaded ring 18 is provided. The ring 18 has an enlarged opening 20 which is internally threaded. A radial wall 22 of the ring is provided with a central opening 24 therethrough which is received over the ferrule 12 but which is smaller in diameter than the ring 16 or the collar 14, so that the wall 22 is captivated lengthwise of the ferrule 12 between the ring 16 and the ferrule 14. The threaded ring 18 is freely rotateable over the ferrule for a purpose to be described.

The ferrule 12 is fabricated by molding a resiliently deformable plastic material such as polypropylene. The ferrule 12 includes an elongated cylindrical section 26, a frustoconical section 28, separated from the section 26 by the collar 14, and a reduced diameter relatively short cylindrical section 30. A reduced diameter cylindrical cavity 32 is coaxially extensive through the section 30 and communicates with an end 34 of the section 30. The cavity 32 further is provided with a frustoconical section 35, which in turn, communicates with an elongated cylindrical cavity section 36 provided with a flared entryway 38 communicating with an opposite end 40 of the ferrule.

As shown in FIGS. 1 and 2, the cable 1 has the outer jacket 6 trimmed back from an exposed protruding length of waveguide, exposing some of the tension fibers or strands 8, and the cladding portion of the waveguide. Trimming of the jacket is accomplished by cutting it away with a razor knife, for example. The length of protruding cladding 4 is selected to extend from the internal end of the cavity section 36 to the end 34 of the ferrule. The cladding 4 itself is trimmed back to expose a length of core 2 of the waveguide. Removal of the cladding from the core is accomplished mechanically using a wire insulation stripping tool, normally utilized to strip insulation from an insulation covered wire to expose a length of wire. Such a tool is well known and is disclosed, for example, in U.S. Pat. No. 3,525,107. The cladding alternatively is readily removed by using a suitable solvent which disolves the cladding without damaging the core 2. The particular type of solvent to be used is commercially available and can be specified by a manufacturer of the cable 1.

Yet with reference to FIGS. 1 and 2 the ferrule 10 is to be secured to the end of the cable 1 to provide a connector for the cable. FIG. 1 illustrates a quantity of solidifiable adhesive and filler material 42, such as epoxy resin, for example. The resin is applied to the largest diameter portion of the ferrule cavity followed by insertion of the cable 1. As the cable 1 is inserted into the cavity section 38, it will displace and distribute the quantity of resin 42 along the entire interior cavity of the ferrule, even causing some of the resin to become expelled and adhered to the end 34 of the ferrule. FIG. 2 illustrates the desired initial position of the cable 1, with the jacket 6 within the cavity section 36. The cladding 4 protruding from the remainder of the cable 1 is freely received and contained within the cavity sections 34 and 32. The end of the core 4 is approximately aligned with the end 34 of the ferrule. The core 2 protruding from the remainder of the cladding 4 protrudes outwardly of the end 34 of the ferrule. The tension strands or fibers 8 become turned back upon themselves as the cable 1 is inserted into the ferrule. The strands or fibers 8 overlie the jacket lengthwise thereof and are readily displaced by the entry of the jacket 6 into the ferrule.

FIG. 2 illustrates that the axis 44 of the core 2 is concentrically misaligned with the axis 46 of the cladding 4. FIG. 5 is a diagramatic view of the ferrule end 34, illustrating its major axis at the intersection of center lines 48 and 50. The ferrule cavity section 32 is coaxial with the ferrule section 30 and receives therein the cladding 4 together with some of the epoxy resin 42 which fills the radial clearance space between the cladding 4 and the inter wall of the ferrule which defines the cavity section 32. The core 2 has its axis 44 concentrically misaligned with respect to the axis of the ferrule section 30. During manufacture of the waveguide, the cladding 4 may undergo distortion and will not always be circular in cross section. In addition, the cladding will not always be concentrically aligned with the core. Accordingly it has been found that alignment of the waveguide by its cladding concentrically within the ferrule end portion 30 will not correctly position the light transmitting core 2 coincident with the axis of the ferrule at its end 34. The present invention recognizes the need, therefore, to assemble the ferrule over the waveguide in such a way that the core itself is in coincident alignment with the axis of the ferrule, disregarding the alignment of the cladding 4. However, the presence of the cladding 4 is important to prevent attenuation of optic signals from the core. The present invention further advantageously retains all the benefits of the cladding 4, allowing the cladding to remain throughout the entire length of the assembly of the ferrule and waveguide.

To this end, FIGS. 1 and 3 illustrate an alignment fixture, generally at 52. The fixture is in the form of a short sleeve of molded rigid plastics material having an inner cylindrical cavity 54 communicating at one end 56 of the fixture and provided with a slight chamfer 58 to provide a funnel entry. An integral transverse wall 60 is provided at the opposite end of the fixture through which a reduced diameter bore 62 is provided, which communicates precisely concentric with the cavity 54. With the ferrule 10 assembled over the wave guide cable 1 as shown in FIG. 2, and prior to curing or solidification of the adhesive material 42, the fixture 52 is assembled over the end 34 of the ferrule, as shown in FIG. 3. More particularly, the protruding portion of the core 2 is initially received in the bore 62 of the fixture. The fixture cavity 54 is then radially press fit over the cylindrical end 30 of the ferrule. In order to receive the ferrule within the cavity 54, the fixture must reposition the core 2 in coincident alignment with the cylindrical end portion 30 of the ferrule. The fixture will displace excess adhesive material 42 away from the end 34 of the ferrule allowing the material to be wiped away or otherwise removed. Accordingly, the fixture aligns the core concentrically with the cylindrical end 30 and is used to retain the ferrule and waveguide core in coincident alignment until the adhesive 42 solidifies, to bond and fixedly secure the core end portion concentrically within the ferrule, and to fixedly secure the assembly of the ferrule and the waveguide and also the cable jacket 6.

In order to insure that the cladding 4 extends entirely throughout the length of the ferrule, with the fixture 52 in place as shown in FIG. 3, and prior to solidification of the adhesive material 42, the cable 1 is adjusted lengthwise within the ferrule cavity. More particularly, the cable is pushed toward the end wall 60 of the fixture 52, impinging the end of the cladding 4 against the end wall. The end wall 60 may also impinge the end 34 of the ferrule. Alternatively, as shown in FIG. 3, the end of the cladding 4 may be pushed to project slightly outwardly from the end 34 of the ferrule, in which case the end wall 60 is displaced slightly away from the end 34. The cladding 4 will be in a desired alignment with the end 34 whether flush with or slightly projecting therefrom. With the cladding and in desired alignment with the end of the ferrule, the ring 16 is radially inwardly deformed by a pliers type of tool to radially compress the ferrule in gripped compression over the jacket 6, as shown in FIG. 4. The adhesive material is allowed to solidify or cure with the fixture in place.

FIG. 4 illustrates the final step in the assembly of the ferrule to the cable. A grinding and polishing disc is illustrated diagramatically at 64. The disc or wheel grinds the core 2, the solidified adhesive material 42 and the cladding 4 flush with the end of the ferrule end portion 30. As shown in the figure, the end 34 of the ferrule may also be partially ground away and polished in order to achieve the desired flush configuration of the ferrule and the wave guide.

The fixture 52 may remain on the end portion 30 of the ferrule during the grinding operation; it also being ground away at least partially. The remains of the fixture may then be removed from the assembly. Alternatively, the fixture 52 may have its internal cavity 54 and the bore 62 thereof sprayed with an adhesive releasable or repellant material in the form of a mold release material, such as silicone or polysiloxane, prior to assembly over the ferrule end portion 30. The mold release material will allow the fixture to be removed after solidification of the adhesive material 42.

FIG. 6 is a diagrammatic end view of the assembly as shown in FIG. 3 showing the concentric alignment of the cylindrical periphery of the ferrule 34 radially press fit within the cylindrical cavity 54, with the axis of the core 2 in coincident alignment with the axis of the ferrule 34 defined by the intersecting center lines 48 and 50.

FIG. 7 illustrates an optic splice or junction of two lengths of waveguide in end to end coincident alignment. The splice includes a rigid plastic connector body or bushing having external threads 68 at each end thereof. The bushing includes an internal cavity having a central cylindrical cavity section 70 flanked by oppositely flared cavity sections 72 communicating with corresponding ends 74 of the bushing 66. An assembly of a ferrule and waveguide is inserted into each end of the bushing 66. More particularly, each ferrule end portion 34 is press fit within the cavity section 70. The two ferrule ends directly oppose each other with the cores 2 therein in coincident end to end alignment. It is noted that the two claddings 4 of the two waveguides are not aligned, yet their benefits are not lost as they extend entirely the length of each corresponding ferrule and core 2. Each ferrule will have its collar portion 14 impinged against a corresponding end 74. The locking ring 18 of each ferrule will have its internal threads 20 threadibly secured over the corresponding threads 68 of the bushing 66 to retain each ferrule removeably secured to the bushing.

What has been disclosed is a preferred embodiment of the present invention. Other modifications and embodiments which would be apparent to one having ordinary skill in the art is intended to be covered by the spirit and scope of the appended claims.

What is claimed is:

1. A method of terminating an end of a fiber optic cable in a fiber optic connector, comprising the sequential steps of:
    positioning the end of the fiber optic cable within a passageway of the fiber optic ferrule along with a solidifiable encapsulant material until an exposed end of an optic waveguide extends outwardly beyond a forward end of said ferrule;
    placing said forward end of said ferrule within a bore of a fixture with said exposed end of said waveguide extending through a hole in said fixture, said hole being concentric with said bore so that the axis of said exposed end of said waveguide is in coincident alignment with the axis of said ferrule;
    solidifying said encapsulant material thereby securing the end of the fiber optic cable in said ferrule;
    removing said fixture from said forward end of said ferrule; and polishing said exposed end of said waveguide.

2. The method as recited in claim 1, wherein, polishing a portion of said waveguide includes, removing at least portions of said fixture and polishing said portion of said waveguide flush with said ferrule forward end.

3. The method as recited in claim 1, wherein, removal of said fixture is performed prior to polishing said portion of said waveguide.

4. The method as recited in claim 1, and further including the step of:
    applying an adhesive releasable material on said fixture prior to assembly thereof on said portion of said waveguide and said ferrule.

5. The method as recited in claim 1, wherein, said waveguide includes cladding covering a light transmitting core, and said portion of said waveguide comprises a portion of said core, and further including the steps of:
    removing said cladding from said portion of said core prior to projection thereof beyond said ferrule forward end and into said hole of said fixture.

6. The method as recited in claim 5, wherein, polishing a surface of said portion of said waveguide includes, polishing a surface of said portion of said core flush with said cladding and flush with said ferrule forward end.

* * * * *

UNITED STATES PATENT AND TRADEMARK OFFICE
CERTIFICATE OF CORRECTION

PATENT NO. : 4,362,356
DATED : December 7, 1982
INVENTOR(S) : Russell H. Williams and Robert F. Meehan It is certified that error appears in the above-identified patent and that said Letters Patent is hereby corrected as shown below:

On the title page item [75] inventors, the second-named inventor "Robert F. Meeham" should read --Robert F. Meehan--.

Signed and Sealed this

Fourteenth Day of June 1983

[SEAL]

Attest:

DONALD J. QUIGG

Attesting Officer     Acting Commissioner of Patents and Trademarks